(12) United States Patent
Yang (10) Patent No.: US 10,827,050 B2
(45) Date of Patent: Nov. 3, 2020

(54) ELECTRONIC DEVICE AND ACTUATING MECHANISM THEREOF

(71) Applicant: CHICONY ELECTRONICS CO., LTD., New Taipei (TW)

(72) Inventor: San-Pen Yang, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/528,351

(22) Filed: Jul. 31, 2019

(65) Prior Publication Data

US 2020/0314224 A1    Oct. 1, 2020

(30) Foreign Application Priority Data

Mar. 26, 2019  (TW) ............................. 108110536 A (51) Int. Cl.
| | |
|---|---|
| *G06F 1/16* | (2006.01) |
| *H04N 5/222* | (2006.01) |
| *H04M 1/02* | (2006.01) |
| *H04N 5/225* | (2006.01) |

(52) U.S. Cl.
CPC ........ *H04M 1/0264* (2013.01); *H04N 5/2252* (2013.01); *H04N 5/2254* (2013.01)

(58) Field of Classification Search
CPC . H04M 1/0264; H04N 5/2254; H04N 5/2252; G06F 1/183; F03G 7/065
See application file for complete search history.

(56) References Cited

U.S. PATENT DOCUMENTS

| | | | | |
|---|---|---|---|---|
| 5,880,928 A | * | 3/1999 | Ma ........................ | G06F 1/1616 361/679.23 |
| 6,118,653 A | * | 9/2000 | Kim ...................... | G06F 1/1616 361/679.23 |
| 7,256,987 B2 | * | 8/2007 | Weng .................... | G06F 1/1616 292/138 |
| 7,435,018 B2 | * | 10/2008 | Huang .................. | G03B 17/04 348/373 |
| 8,405,765 B2 | * | 3/2013 | Lin ....................... | H04N 5/2251 348/373 |
| 8,430,594 B2 | * | 4/2013 | Liu ....................... | H04N 5/2252 403/321 |
| 9,392,148 B2 | * | 7/2016 | Kim ..................... | H04N 5/2257 |
| 10,136,525 B2 | * | 11/2018 | Huang ................. | G06F 1/1603 |

(Continued)

*Primary Examiner* — Rockshana D Chowdhury
(74) *Attorney, Agent, or Firm* — Muncy, Geissler, Olds & Lowe, P.C.

(57) ABSTRACT

The present disclosure discloses an actuating mechanism disposed in an electronic device, which includes an opening. The actuating mechanism comprises a moving member, a first lever, a second lever, a first shape memory alloy member and a second shape memory alloy member. The moving member corresponds to the opening and has a first limiting slot and a second limiting slot. The first lever has a first minor axis and a first major axis, and one end of the first major axis connects to the first limiting slot. The second lever has a second minor axis and a second major axis, and one end of the second major axis connects to the second limiting slot. One end of the first shape memory alloy member connects to the first minor axis. One end of the second shape memory alloy member connects to the second minor axis.

20 Claims, 4 Drawing Sheets

(56) References Cited

U.S. PATENT DOCUMENTS

| | | | |
|---|---|---|---|
| 2005/0168924 A1* | 8/2005 | Wu | G06F 1/1679 |
| | | | 361/679.58 |
| 2005/0201047 A1* | 9/2005 | Krah | G06F 1/1616 |
| | | | 361/679.55 |
| 2010/0053409 A1* | 3/2010 | Chang | G06F 1/1605 |
| | | | 348/333.01 |
| 2010/0328015 A1* | 12/2010 | Vanska | G03B 11/043 |
| | | | 337/123 |
| 2011/0050910 A1* | 3/2011 | Fan | H04N 5/2252 |
| | | | 348/207.1 |
| 2012/0099016 A1* | 4/2012 | Lee | H04M 1/0264 |
| | | | 348/373 |

* cited by examiner

ELECTRONIC DEVICE AND ACTUATING MECHANISM THEREOF

BACKGROUND

1. Technical Field

The present disclosure relates to an electronic device, and more particularly, to an actuating mechanism of the electronic device.

2. Description of the Related Art

For aesthetic reasons, an electronic device with a display screen, such as a mobile phone, tablet computer, notebook, or All-In-One computer, is usually designed with high screen-to-body ratio. That is, the border around the display screen is greatly reduced, and some display screens have no border. However, the design of the slim border or borderless display screen allows less space for mounting other functional components.

Specifically, the lens of the camera module is commonly disposed on the border of the display screen, especially on the upper side. The design of a slim border or borderless screen limits the space for mounting the lens. Further, the users of electronic products are concerned about network security and privacy. Many such users cover the lens of the camera module with stickers to prevent other parties from using the camera to invade their privacy.

To solve the above problems, the camera module and its lens can be disposed inside the electronic device, and when the camera function is required, the lens can be protruded from the electronic device. In the prior art, an actuating mechanism such as a motor or an electromagnetic valve is used to connect the camera module and the housing of the electronic device so that the lens can be protruded from the electronic device.

However, because of the large size of the actuating mechanism (such as a motor or an electromagnetic valve), such design can only be applied to a larger and thicker electronic device, such as a notebook computer, All-In-One computer or display screen. It cannot be applied to smaller and thinner electronic devices such as mobile phones, tablet computers or other thin-type electronic devices. Therefore, there is a need to provide a thin-type actuating mechanism which can be applied to the thin-type electronic device in order to mitigate and/or obviate the aforementioned problems.

SUMMARY

In view of the above problems, the main object of the present disclosure is to provide an electronic device and its actuating mechanism, wherein a moving member can be actuated by the connection of two levers and two shape memory alloy members, thereby solving the problem that the size of the conventional actuating mechanism is so large that it cannot be applied in the thin-type electronic device.

In order to achieve the above object, the present disclosure provides an actuating mechanism which is disposed in an electronic device. The electronic device includes an opening and a functional member. The actuating mechanism comprises a moving member, a first lever, a second lever, a first shape memory alloy member and a second shape memory alloy member. One side of the moving member corresponds to the opening. The moving member has a first limiting slot and a second limiting slot. The functional member is disposed on the moving member. The first lever has a first minor axis and a first major axis, and one end of the first major axis connects to the first limiting slot. The second lever has a second minor axis and a second major axis, and one end of the second major axis connects to the second limiting slot. One end of the first shape memory alloy member connects to the first minor axis. When the first shape memory alloy is heated, the length of the first shape memory alloy member is reduced to generate a pulling force on the first minor axis and drive the first lever to rotate such that the first major axis pushes the moving member toward the opening. One end of the second shape memory alloy member connects to the second minor axis. When the second shape memory alloy member is heated, the length of the second shape memory alloy member is reduced to generate a pulling force on the second minor axis and drive the second lever to rotate, and the second major axis pushes the moving member to move back to the inside of the electronic device.

In order to achieve the above object, the present disclosure further provides an electronic device comprising a housing, a functional member and an actuating mechanism. The housing has an opening. The actuating mechanism is disposed on the housing. The actuating mechanism comprises a moving member, a first lever, a second lever, a first shape memory alloy member and a second shape memory alloy member. One side of the moving member corresponds to the opening. The moving member has a first limiting slot and a second limiting slot. The functional member is disposed on the moving member. The first lever has a first minor axis and a first major axis, and one end of the first major axis connects to the first limiting slot. The second lever has a second minor axis and a second major axis, and one end of the second major axis connects to the second limiting slot. One end of the first shape memory alloy member connects to the first minor axis. When the first shape memory alloy is heated, the length of the first shape memory alloy member is reduced to generate a pulling force on the first minor axis and drive the first lever to rotate, and the first major axis pushes the moving member toward the opening. One end of the second shape memory alloy member connects to the second minor axis. When the second shape memory alloy member is heated, the length of the second shape memory alloy member is reduced to generate a pulling force on the second minor axis and drive the second lever to rotate, and the second major axis pushes the moving member to move back to the inside of the electronic device.

According to an embodiment of the present disclosure, the second limiting slot is closer to the opening than the first limiting slot is.

According to an embodiment of the present disclosure, the moving member is moved between a first position and a second position; in the first position, the moving member is located inside the electronic device, and in the second position, at least part of the moving member is located outside the electronic device.

According to an embodiment of the present disclosure, the actuating mechanism further comprises a torsional spring. The torsional spring has a first leg connecting to the first lever and a second leg connecting to the second lever. When the moving member is located in the first position, the second leg is substantially perpendicular to the second major axis. When the moving member is located in the second position, the first leg is substantially perpendicular to the first major axis.

According to an embodiment of the present disclosure, the moving member comprises a limiting portion, and the actuating mechanism further comprises a guiding rail. The limiting portion is disposed in the guiding rail to limit the movement of the moving member to moving between the first position and the second position.

According to an embodiment of the present disclosure, the actuating mechanism further comprises a base plate, which is disposed on the housing and adjacent to the opening. The guiding rail is disposed on the base plate, and both of the first lever and the second lever are disposed on the base plate.

According to an embodiment of the present disclosure, the guiding rail, the first lever and the second lever are disposed on the housing.

According to an embodiment of the present disclosure, the first limiting slot and the second limiting slot are parallel to the opening.

According to an embodiment of the present disclosure, the first lever further comprises a first fulcrum, and the first lever is rotated with the first fulcrum as a pivot. The second lever further comprises a second fulcrum, and the second lever is rotated with the second fulcrum as a pivot.

According to an embodiment of the present disclosure, each of the first lever and the second lever is respectively an L-shaped rod.

According to an embodiment of the present disclosure, the first shape memory alloy member and the second shape memory alloy member respectively have a predetermined temperature. When the temperature of the first shape memory alloy member or the second shape memory alloy member is higher than the predetermined temperature, the length of the first shape memory alloy member or the second shape memory alloy member is reduced.

As described above, according to the electronic device and the actuating mechanism of the present disclosure, the actuating mechanism comprises two (the first and the second) levers and two (the first and the second) shape memory alloy members, the (first or second) minor axis of the lever connects to a shape memory alloy member, and the (first or second) major axis of the lever connects to the moving member. The memory alloy members have the property of contracting when heated. When the memory alloy members contract, the levers rotate on a fixed fulcrum such that the linear contraction motion of the memory alloy members can be converted into a rotary motion. The shifting of the lever can be amplified by the amplification effect of the moment and the lever arm to provide a sufficient stroke for the moving member and to push the moving member and the functional member out of or into the electronic device. Further, since the memory alloy members and the levers are small and thin, the actuating mechanism composed of the memory alloy members and the levers can be applied in a thin-type electronic device, such as a mobile phone or a tablet computer, instead of a large actuating mechanism composed of a motor or an electromagnetic valve.

DETAILED DESCRIPTION OF THE EMBODIMENTS

In order to make the structure and characteristics as well as the effectiveness of the present disclosure further understood and recognized, a detailed description of the present disclosure is provided as follows, along with embodiments and accompanying figures.

Figure 1A:
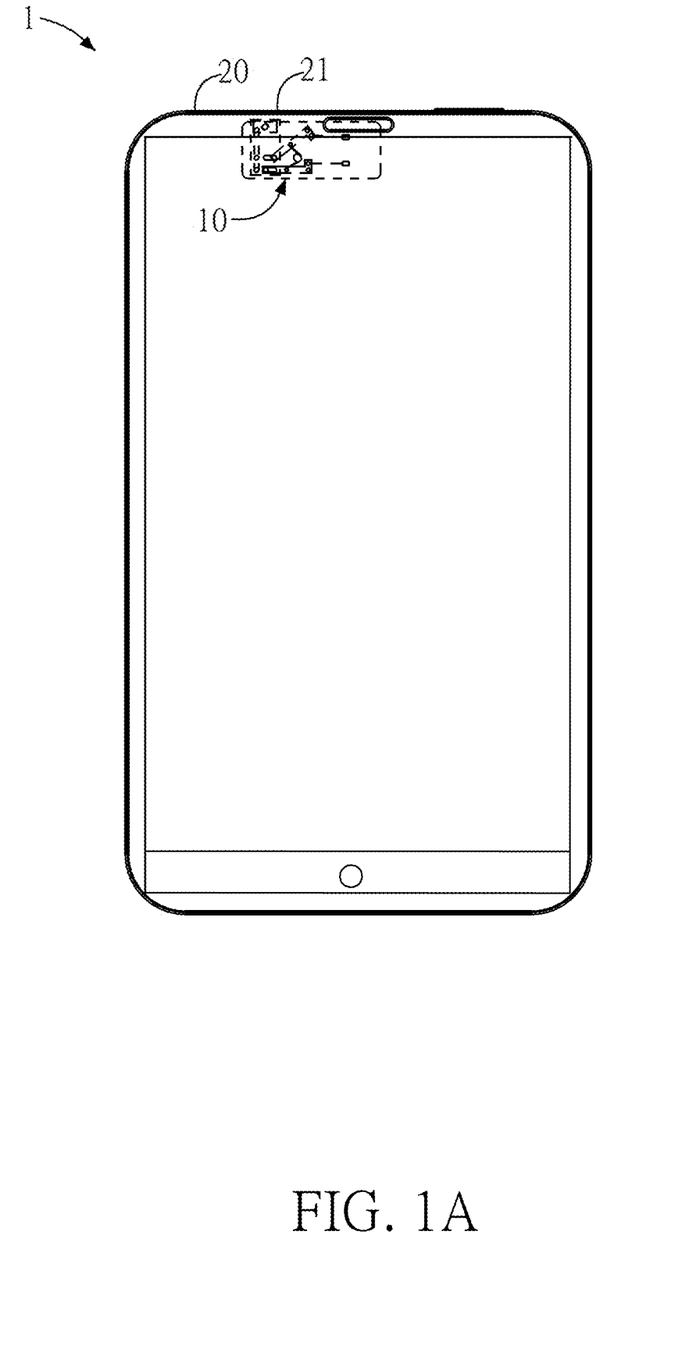
FIG. 1A illustrates a schematic view of an electronic device according to an embodiment of the present disclosure.
Figure 1B:
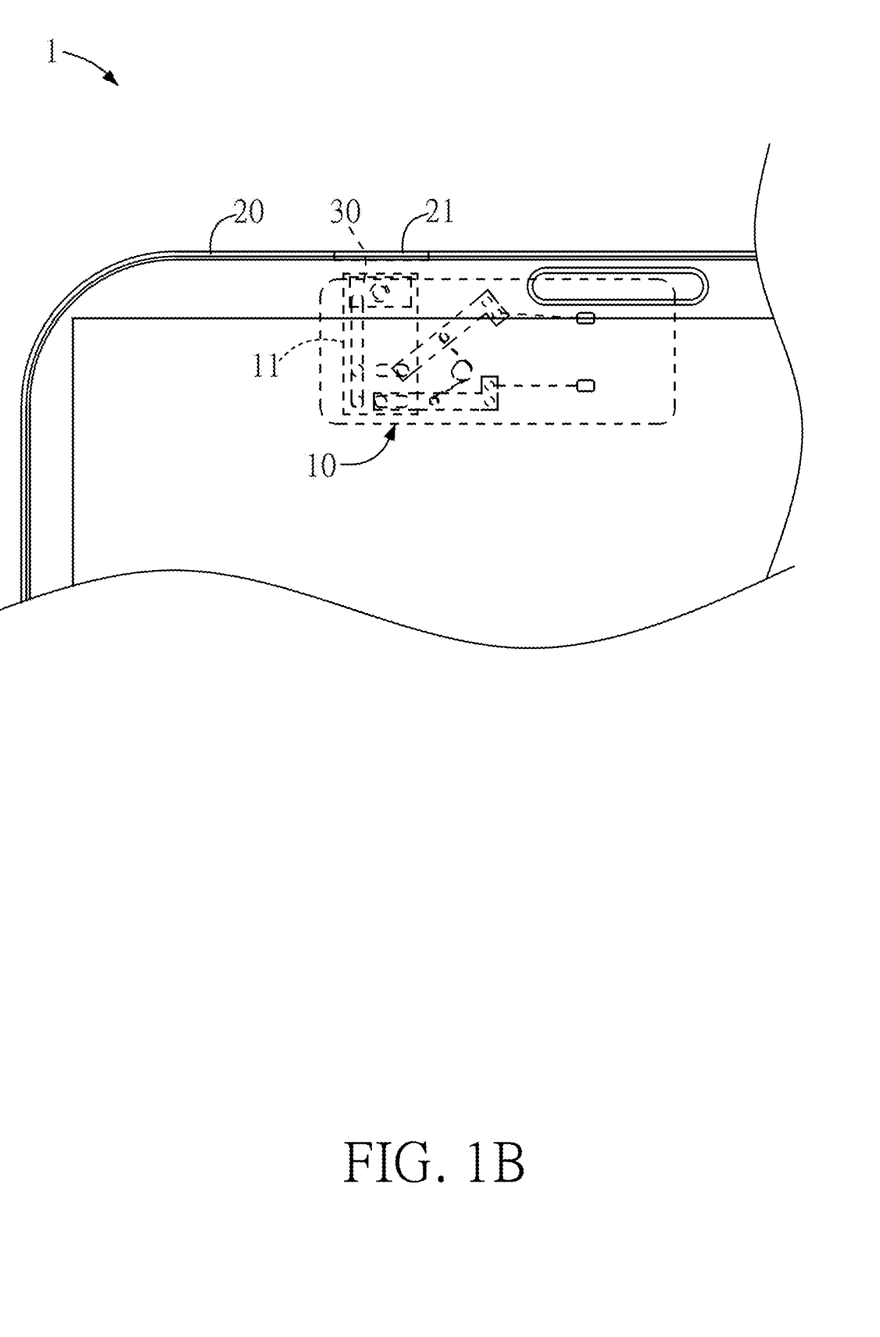
FIG. 1B illustrates a partial enlarged view of the electronic device shown in FIG. 1A.

Please refer to FIG. 1A and FIG. 2A, wherein FIG. 1A illustrates a schematic diagram of an electronic device 1 according to an embodiment of the present disclosure and FIG. 1B illustrates a partial enlarged view of the electronic device 1 shown in FIG. 1A. An electronic device 1 comprises an actuating mechanism 10, a housing 20 and a functional member 30. The electronic device 1 can be, for example but not limited to, a mobile phone, a tablet computer, a notebook, an All-in-one computer (All in One PC), or a display screen, and preferably can be a mobile phone or a tablet computer that is small in size and slim. The functional member 30 can be an element that needs to move between the inside and the outside of the electronic device 1, such as a camera module.

Now refer to FIG. 1A. The housing 20 has an opening 21, and the functional member 30 connects to the actuating mechanism 10. The actuating mechanism 10 and the functional member 30 are disposed in the housing 20 and are located between a screen and the bottom of the housing 20 and adjacent to the opening 21. By the mechanism design of the actuating mechanism 10, the functional member 30 can pass through the opening 21 and move between the inside and the outside of the housing 20.

Figure 2:
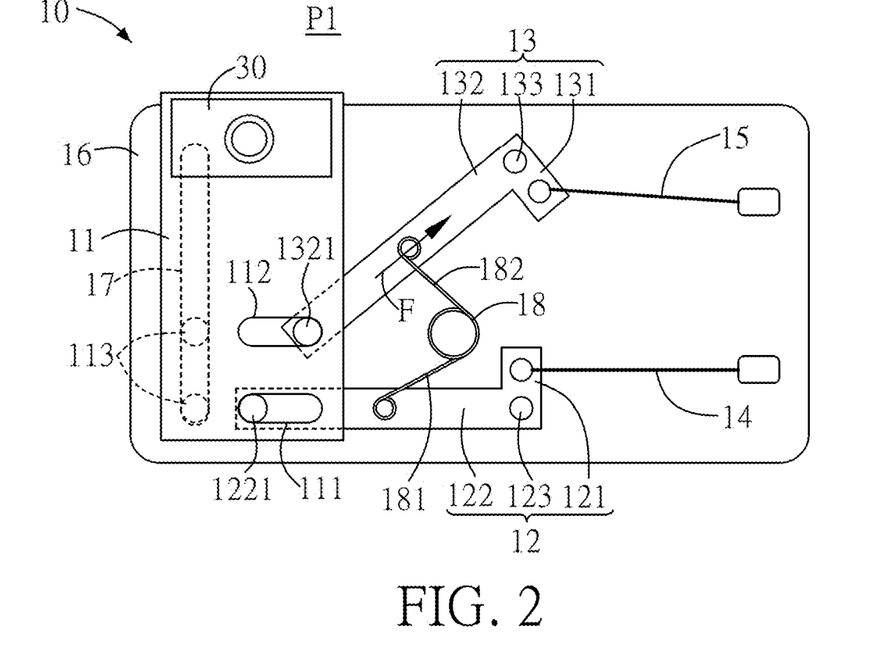
FIG. 2 illustrates a schematic view of an actuating mechanism and a functional member shown in FIG. 1B.

Now refer to FIG. 1B and FIG. 2, wherein FIG. 2 illustrates a schematic view of the actuating mechanism 10 and the functional member 30 shown in FIG. 1B. The actuating mechanism 10 comprises a moving member 11, a first lever 12, a second lever 13, a first shape memory alloy member 14 and a second shape memory alloy member 15. In this embodiment, the actuating mechanism 10 further comprises a base plate 16, which is disposed on the housing 20 of the electronic device 1 and adjacent to the opening 21. All elements of the actuating mechanism 10, such as the moving member 11, the first lever 12, the second lever 13, the first shape memory alloy member 14 and the second shape memory alloy member 15, are disposed on the base plate 16. In another embodiment, all elements of the actuating mechanism 10 as described can also directly be disposed on the housing 20.

One side of the moving member 11 corresponds to the opening 21, and the functional member 30 is disposed on the moving member 11. Preferably, the functional member 30 is disposed on a side close to the opening 21 such that the functional member 30 can pass through the opening 21 and move outside the electronic device 1 along with the moving member 11. The movement of the moving member 11 is achieved by two levers (the first lever 12 and the second lever 13) and two shape memory alloy members (the first shape memory alloy member 14 and the second shape memory alloy member 15).

The first lever 12 of this embodiment comprises a first minor axis 121, a first major axis 122 and a first fulcrum 123, and the first fulcrum 123 is located between the first minor axis 121 and the first major axis 122. The first fulcrum 123 is fixed to the base plate 16 such that the first lever 12 (including the first minor axis 121 and the first major axis 122) rotates with the first fulcrum 123 as a pivot. Further, the first minor axis 121 connects to the first shape memory alloy member 14, and the first major axis 122 connects to the moving member 11. Specifically, one end of the first shape memory alloy member 14 connects to the first minor axis 121, and the other end is fixed to the base plate 16 or the housing 20. In this embodiment, the other end of the first shape memory alloy member 14 is fixed to the base plate 16. The moving member 11 comprises a first limiting slot 111 and a second limiting slot 112, and the second limiting slot 112 is closer to the opening 21 than the first limiting slot 111 is. Preferably, the first limiting slot 111 and the second limiting slot 112 are parallel to each other, and both of the limiting slot 111 and the second limiting slot 112 are parallel to the opening 21. In another embodiment, the first limiting slot 111 and the second limiting slot 112 are not limited to being parallel to the opening 21; only a horizontal component similar to the opening 21 is required, but the present disclosure is not limited thereto. One end of the first major axis 122 connects to the first limiting slot 111. Preferably, the first major axis 122 has a first sliding portion 1221, which is accommodated in the first limiting slot 111.

Similarly, the second lever 13 comprises a second minor axis 131, a second major axis 132 and a second fulcrum 133, and the second fulcrum 133 is located between the second minor axis 131 and the second major axis 132. In this embodiment, each of the first lever 12 and the second lever 13 is respectively an L-shaped rod. The second fulcrum 133 is also fixed to the base plate 16 such that the second lever 13 (including the second minor axis 131 and the second major axis 132) rotates with the second fulcrum 133 as a pivot. It is noted that in this embodiment, the elements of the actuating mechanism 10 are directly disposed on the housing 20, and that the first fulcrum 123 and the second fulcrum 133 are also directly fixed to the housing 20. The second minor axis 131 connects to the second shape memory alloy member 15, the second major axis 132 connects to the moving member 11, and the second major axis 132 also has a second sliding portion 1321, which is accommodated in the second limiting slot 112, such that one end of the second major axis 132 connects to the second limiting slot 112. One end of the second shape memory alloy member 15 connects to the second minor axis 131, and the other end is fixed to the base plate 16 or to the housing 20.

The moving member 11 can be moved back and forth by the aforementioned elements and the connection relationship. In this embodiment, the shape memory alloy member 14 and the second shape memory alloy member 15 are wires made of a shape memory alloy (SMA) material, such as a nickel-titanium alloy, which contracts (shortens) when heated. Specifically, the first shape memory alloy member 14 and the second shape memory alloy member 15 respectively have a predetermined temperature which is the characteristic transformation temperature of the shape memory alloy. In this embodiment, the temperature at which the selected nickel-titanium SMA wire transforms to the austenite phase is from 68° C. to 78° C., so the range of the predetermined temperature is between 68° C. and 78° C. When the temperature of the first shape memory alloy member 14 (or the second shape memory alloy member 15) is higher than the predetermined temperature, the first shape memory alloy member 14 (or the second shape memory alloy member 15) transforms to the austenite phase. At this time, the first shape memory alloy member 14 (or the second shape memory alloy member 15) will shorten; in other words, the length of the first shape memory alloy member 14 (or the second shape memory alloy member 15) will be reduced. Preferably, the first shape memory alloy member 14 and the second shape memory alloy member 15 can contract by 3% to 5% when heated. The total length of the heated first shape memory alloy member 14 (or the heated second shape memory alloy member 15) is 3% to 5% shorter than that of the first shape memory alloy member 14 (or the second shape memory alloy member 15) when unheated (that is, in the normal temperature state). Further, when the temperature of the first shape memory alloy member 14 (or the second shape memory alloy member 15) drops below the predetermined temperature, for example, when it drops to 42° C. to 52° C., the phase of the first shape memory alloy member 14 (or the second shape memory alloy member 15) will transform from the austenite phase to the martensite phase, and the first shape memory alloy member 14 (or the second shape memory alloy member 15) will revert to its original shape and length.

Moreover, the shape memory alloy (the first shape memory alloy member 14 or the second shape memory alloy member 15) is often heated by using a short circuit current. In order to increase the temperature of the entire alloy wire evenly, the short circuit current also cooperates with a Pulse-Width Modulator (PWM) to supply power. The memory alloy can be heated and deformed (such as the contraction and shortening of this embodiment) when provided a current in the aforementioned manner. When the current is no longer provided, the large surface-area-to-volume ratio of a small wire diameter will allow the shape memory alloy to dissipate heat quickly and revert to its original shape. The actuating mechanism 10 of this embodiment can be designed to provide current to the first shape memory alloy member 14 when the user activates the camera function and to provide current to the second shape memory alloy member 15 when the user deactivates the camera function.

Figure 3:
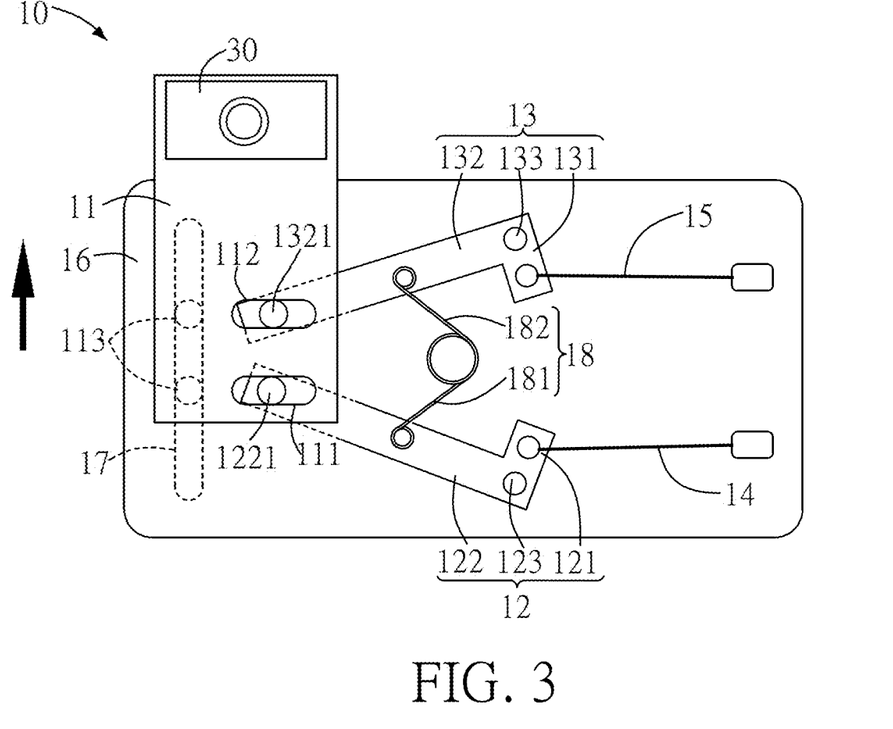
FIG. 3 illustrates a schematic view of the movement after the first shape memory alloy member shown in FIG. 2 is heated.
Figure 4:
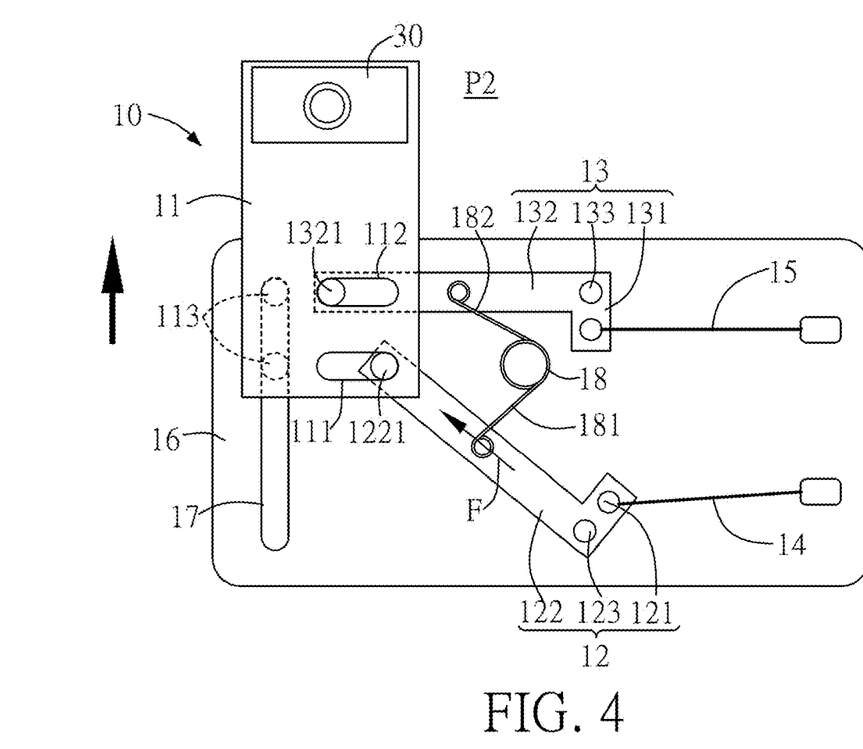
FIG. 4 illustrates a schematic view of the moving member shown in FIG. 2 in a second position.

When the user activates the camera function, the actuating mechanism 10 provides current to the first shape memory alloy member 14 to heat the first shape memory alloy member 14. When the first shape memory alloy member 14 is heated, the first shape memory alloy member 14 contracts and shortens in length. At this moment, the first shape memory alloy member 14 generates a pulling force on the first minor axis 121 and drives the first lever 12 to rotate, as shown in FIG. 3. FIG. 3 illustrates a schematic view of the movement after the first shape memory alloy member 14 shown in FIG. 2 is heated. As shown in FIG. 2 and FIG. 3, the first shape memory alloy member 14 is disposed on the right side of the first lever 12. When the first shape memory alloy member 14 contracts due to being heated, the first minor axis 121 can be pulled to rotate to the right, and the first lever 12 is rotated in the clockwise direction. At this time, the first major axis 122 is lifted up, and the first major axis 122 pushes the moving member 11 toward the opening 21 (the location of the opening 21 as shown in FIG. 1B) by the first sliding portion 1221 moving in the first limiting slot 111. The moving member 11 is moved to the position shown in FIG. 4 and pushes the functional member 30 to protrude from the electronic device 1. FIG. 4 illustrates a schematic view of the moving member 11 shown in FIG. 2 protruded from the electronic device 1 in the second position.

For the sake of clearly describing the movement of each element, in this embodiment, a start position and an end position of the movement of the moving member 11 are referred as a first position P1 and a second position P2, respectively. In other words, the moving member 11 is moved between the first position P1 and the second position P2. Specifically, in the first position P1, the moving member 11 is located inside the electronic device 1. That is, when the functional member 30 is disposed in the electronic device 1 and not in use, the position of the moving member 11 is called the first position P1, as shown in FIG. 2. In the second position P2, at least part of the moving member 11 is located outside the electronic device 1. That is, when part of the functional member 30 is pushed to the outside of the electronic device 1, the position of the moving member 11 is called the second position P2, as shown in FIG. 4.

Figure 5:
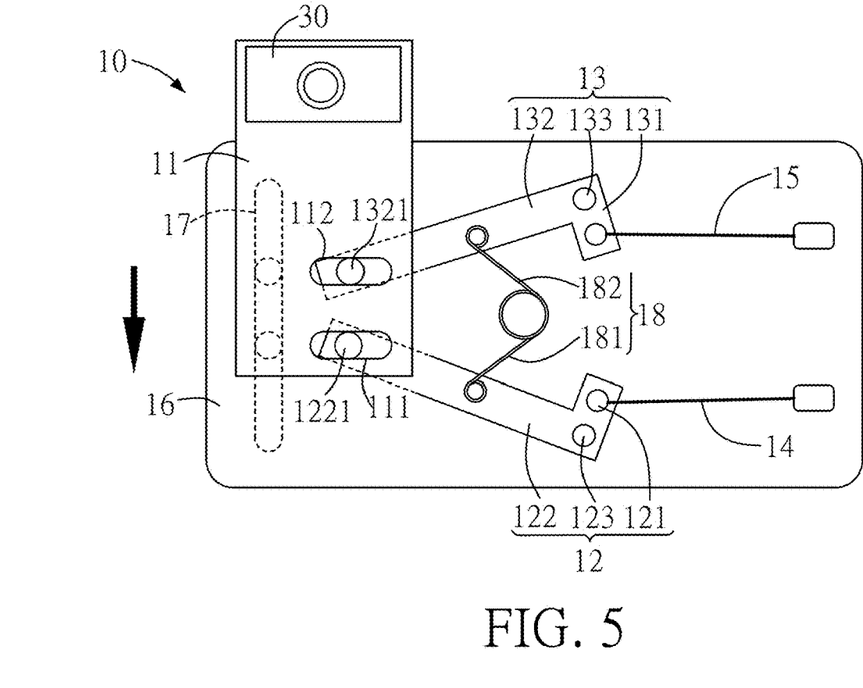
FIG. 5 illustrates a schematic view of the movement after the first shape memory alloy member shown in FIG. 4 is heated.

When the user activates the camera function, the length of the first shape memory alloy member 14 is reduced by being heated, such that the first lever 12 rotates to push the moving member 11 from the first position P1 to the second position P2. When the user deactivates the camera function, current is provided to the second shape memory alloy member 15 and the second shape memory alloy member 15 is heated. When the second shape memory alloy member 15 is heated, the length of the second shape memory alloy member 15 is reduced. At this moment, the shape memory alloy member 15 generates a pulling force on the second minor axis 131 and drives the second lever 13 to rotate, as shown in FIG. 5. FIG. 5 illustrates a schematic view of the movement after the first shape memory alloy member 15 shown in FIG. 4 is heated. As shown in FIG. 4 and FIG. 5, the second shape memory alloy member 15 is disposed on the right side of the second lever 13. When the second shape memory alloy member 15 contracts due to being heated, the second minor axis 131 can be pulled to rotate to the right side, and the second lever 13 rotates in the counterclockwise direction. At this moment, the second major axis 132 is pressed down, and the second major axis 132 pushes the moving member 11 to move back into the electronic device 1 by the second sliding portion 1321 moving in the second limiting slot 112, and the moving member 11 is moved to the first position P1 as shown in FIG. 2.

In this embodiment, the shape memory alloy has the property of contracting when heated. When the shape memory alloy (the first shape memory alloy member 14 or the second shape memory alloy member 15) contracts, the lever (the first lever 12 or the second lever 13) rotates on a fixed fulcrum (the first fulcrum 123 or the second fulcrum 133) such that the linear contraction motion of the memory alloy member can be converted into a rotary motion. Although the amount of the contraction of the shape memory alloy is limited, the shifting can be amplified by the amplification effect of the moment and the lever arm to provide a sufficient stroke for the moving member 11. The first sliding portion 1221 of the first major axis 122 is accommodated in the first limiting slot 111, and the second sliding portion 1321 of the second major axis 132 is accommodated in the second limiting slot 112, so the rotation of the first lever 12 and the second lever 13 can be converted into a linear motion of the moving member 11. Further, since the shape memory alloy (the first shape memory alloy member 14 or the second shape memory alloy member 15) and the lever (the first lever 12 or the second lever 13) are small and thin, the actuating mechanism 10 can be applied in a thin-type electronic device 1, such as a mobile phone or a tablet computer.

Preferably, the actuating mechanism 10 further comprises a guiding rail 17 and the moving member 11 comprises a limiting portion 113. The limiting portion 113 is accommodated in the guiding rail 17 to limit the movement of the moving member 11 to moving between the first position P1 and the second position P2. In this embodiment, the guiding rail 17 is disposed on the base plate 16 and is perpendicular to the linear rail of the opening 21 to limit the moving member 11 to moving back and forth in a linear manner. In another embodiment, the width of the moving member 11 is restricted to slightly smaller than the width of the opening 21 to limit the moving member 11 to moving in a linear manner. In another embodiment, such as the embodiment without a base plate 16, the guiding rail 17 is directly disposed on the housing 20, but the present disclosure is not limited thereto. Moreover, in another embodiment, the guiding rail 17 may also be disposed on the bottom surface of the moving member 11 and a limiting portion may be correspondingly formed on the base plate 16 or the housing 20; this design can also achieve the effect of limiting the movement of the moving member 11 to moving between the first position P1 and the second position P2.

Preferably, the actuating mechanism 10 of the present embodiment further comprises a torsional spring 18, which has a first leg 181 and a second leg 182. The first leg 181 connects to the first lever 12, and the second leg 182 connects to the second lever 13. The moving member 11 can be retained at the first position P1 or the second position P2 by the disposition of the torsional spring 18. First, for example, the first shape memory alloy member 14 contracts due to being heated such that first lever 12 is rotated to push the moving member 11 to the second position P2 (as shown in FIG. 4). When the moving member 11 is located at the second position P2, the first leg 181 is substantially perpendicular to the first major axis 122. At this time, the forcing direction F of the first leg 181 is parallel to the first major axis 122 (the arm of force), such that the first major axis 122 cannot be pushed and the angle of the first lever 12 will be maintained. Even after the first shape memory alloy member 14 returns to the normal temperature and reverts to the original shape (original length), the first lever 12 will not return to its original state (that is, will not return to the position shown in FIG. 2), such that the moving member 11 can be retained at the second position P2.

Moreover, the torsional spring 18 has a preloaded value. When the second shape memory alloy member 15 is shortened by being heated, the second shape memory alloy member 15 pulls the first minor axis 121 and the second major axis 132 is rotated with the second fulcrum 133 as a pivot in the counterclockwise direction. When the shift value of the second major axis 132 is greater than the preloaded value of the torsional spring 18, the retained state can be released to push the moving member 11 to move to the first position P1. Similarly, when the moving member 11 is located at the first position P1, the second leg 182 is substantially perpendicular to the second major axis 132, and the forcing direction F of the second leg 182 is parallel to the second major axis 132 (the arm of force), such that the second major axis 132 cannot be pushed and the angle of the second lever 13 is maintained, and the moving member 11 is retained at the first position P1. Similarly, when the shift value of the first major axis 122 is greater than the preloaded value of the torsional spring 18, the retained state can be released to push the moving member 11 to move to the second position P1.

As described above, according to the electronic device and the actuating mechanism of the present disclosure, the actuating mechanism comprises two (the first and the second) levers and two (the first and the second) shape memory alloy members, the (first or second) minor axis of the lever connects to the shape memory alloy member, and the (first or second) major axis of the lever connects to the moving member. The memory alloy members have the property of contracting when heated. When the shape memory alloy members contract, the levers are rotated on a fixed fulcrum such that the linear contraction motion of the memory alloy members can be converted into a rotary motion. The shift of the lever can be amplified by the amplification effect of the moment and the lever arm to provide a sufficient stroke for the moving member and to push the moving member and the functional member outside the electronic device. Further, since the memory alloy members and the levers are small and thin, the actuating mechanism composed of the memory alloy members and levers can be applied in thin-type electronic devices such as mobile phones and tablet computers to replace the large actuating mechanism composed of a motor or an electromagnetic valve.

It is noted that the above-described embodiment is merely illustrative of a preferred embodiment of the present disclosure, and that in order to avoid redundancy, not all possible combinations of variations are described in detail; various changes and modifications may be made to the described embodiments without departing from the scope of the disclosure as described by the appended claims.

What is claimed is:

1. An actuating mechanism, disposed on an electronic device comprising an opening and a functional member, the actuating mechanism comprising:
    a moving member, one side corresponding to the opening, the moving member having a first limiting slot and a second limiting slot, and the functional member being disposed on the moving member;
    a first lever, having a first minor axis and a first major axis, one end of the first major axis being connected to the first limiting slot;
    a second lever, having a second minor axis and a second major axis, one end of the second major axis being connected to the second limiting slot;
    a first shape memory alloy member, one end being connected to the first minor axis, wherein when the first shape memory alloy is heated, the length of the first shape memory alloy member is reduced to generate a pulling force on the first minor axis and drive the first lever to rotate, and the first major axis pushes the moving member toward the opening; and
    a second shape memory alloy member, one end being connected to the second minor axis, wherein when the second shape memory alloy member is heated, the length of the second shape memory alloy member is reduced to generate a pulling force on the second minor axis and drive the second lever to rotate, and the second major axis pushes the moving member to move back to the inside of the electronic device.

2. The actuating mechanism as claimed in claim 1, wherein the second limiting slot is closer to the opening than the first limiting slot.

3. The actuating mechanism as claimed in claim 1, wherein the moving member is moved between a first position and a second position; in the first position, the moving member is located inside the electronic device, and in the second position, at least part of the moving member is located outside the electronic device.

4. The actuating mechanism as claimed in claim 3, further comprising:
    a torsional spring having a first leg connected to the first lever and a second leg connected to the second lever, wherein when the moving member is located in the first position, the second leg is substantially perpendicular to the second major axis, and when the moving member is located in the second position, the first leg is substantially perpendicular to the first major axis.

5. The actuating mechanism as claimed in claim 3, wherein the moving member comprises a limiting portion, the actuating mechanism further comprising:
    a guiding rail, the limiting portion being disposed in the guiding rail to limit the movement of the moving member to moving between the first position and the second position.

6. The actuating mechanism as claimed in claim 5, further comprising:
    a base plate disposed on the electronic device and adjacent to the opening, the guiding rail being disposed on the base plate and both of the first lever and the second lever being disposed on the base plate.

7. The actuating mechanism as claimed in claim 1, wherein the first limiting slot and the second limiting slot are parallel to the opening.

8. The actuating mechanism as claimed in claim 1, wherein the first lever further comprises a first fulcrum, the first lever rotates with the first fulcrum as a pivot, the second lever further comprises a second fulcrum, and the second lever rotates with the second fulcrum as a pivot.

9. The actuating mechanism as claimed in claim 1, wherein each of the first lever and the second lever is respectively an L-shaped rod.

10. The actuating mechanism as claimed in claim 1, wherein the first shape memory alloy member and the second shape memory alloy member respectively have a predetermined temperature, wherein when the temperature of the first shape memory alloy member or the second shape memory alloy member is higher than a predetermined temperature, the length of the first shape memory alloy member or the second shape memory alloy member is reduced.

11. An electronic device, comprising:
    a housing, having an opening;
    a functional member; and
    an actuating mechanism, disposed on the housing, the actuating mechanism comprising:
        a moving member, one side corresponding to the opening, the moving member having a first limiting slot and a second limiting slot, and the functional member being disposed on the moving member;
        a first lever, having a first minor axis and a first major axis, one end of the first major axis being connected to the first limiting slot;
        a second lever, having a second minor axis and a second major axis, one end of the second major axis being connected to the second limiting slot;
        a first shape memory alloy member, one end being connected to the first minor axis, wherein when the first shape memory alloy is heated, the length of the first shape memory alloy member is reduced to generate a pulling force on the first minor axis and drive the first lever to rotate such that the first major axis pushes the moving member toward the opening; and
        a second shape memory alloy member, one end being connected to the second minor axis, wherein when the second shape memory alloy member is heated, the length of the second shape memory alloy member is reduced to generate a pulling force on the second minor axis and drive the second lever to rotate such that the second major axis pushes the moving member to move back to the inside of the electronic device.

12. The electronic device as claimed in claim 11, wherein the second limiting slot is closer to the opening than the first limiting slot is.

13. The electronic device as claimed in claim 11, wherein the moving member is moved between a first position and a second position; in the first position, the moving member is located inside the electronic device, and in the second position, at least part of the moving member is located outside the electronic device.

14. The electronic device as claimed in claim 13, wherein the actuating mechanism further comprises a torsional spring, the torsional spring having a first leg connected to the first lever and a second leg connected to the second lever, wherein when the moving member is located in the first position, the second leg is substantially perpendicular to the second major axis, and when the moving member is located in the second position, the first leg is substantially perpendicular to the first major axis.

15. The electronic device as claimed in claim 13, wherein the moving member comprises a limiting portion, the actuating mechanism further comprises a guiding rail, and the limiting portion is disposed in the guiding rail to limit the movement of the moving member to moving between the first position and the second position.

16. The electronic device as claimed in claim 15, wherein the guiding rail, the first lever and the second lever are disposed on the housing.

17. The electronic device as claimed in claim 11, wherein the first limiting slot and the second limiting slot are parallel to the opening.

18. The electronic device as claimed in claim 11, wherein the first lever further comprises a first fulcrum, the first lever rotates with the first fulcrum as a pivot, the second lever further comprises a second fulcrum, and the second lever rotates with the second fulcrum as a pivot.

19. The actuating mechanism as claimed in claim 1, wherein the first lever and the second lever are respectively an L-shaped rod.

20. The electronic device as claimed in claim 11, wherein the first shape memory alloy member and the second shape memory alloy member respectively have a predetermined temperature, wherein when the temperature of the first shape memory alloy member or the second shape memory alloy member is higher than the predetermined temperature, the length of the first shape memory alloy member or the second shape memory alloy member is reduced.

* * * * *